(12) United States Patent
Bengtsson et al.

(10) Patent No.: US 11,108,452 B2
(45) Date of Patent: Aug. 31, 2021

(54) TAILORED BEAM MANAGEMENT OF BEAMFORMED TRANSMISSION

(71) Applicant: Sony Corporation, Tokyo (JP)

(72) Inventors: Erik Bengtsson, Eslöv (SE); Olof Zander, Södra Sandby (SE)

(73) Assignee: SONY CORPORATION

( * ) Notice: Subject to any disclaimer, the term of this patent is extended or adjusted under 35 U.S.C. 154(b) by 0 days.

(21) Appl. No.: 16/975,496

(22) PCT Filed: Feb. 28, 2019

(86) PCT No.: PCT/IB2019/051598
§ 371 (c)(1),
(2) Date: Aug. 25, 2020

(87) PCT Pub. No.: WO2019/166973
PCT Pub. Date: Sep. 6, 2019

(65) Prior Publication Data
US 2021/0036754 A1    Feb. 4, 2021

(30) Foreign Application Priority Data

Mar. 2, 2018  (SE) .................................. 1830071-5

(51) Int. Cl.
*H04J 3/06* (2006.01)
*H04B 7/06* (2006.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC ... H04W 24/02; H04W 52/42; H04W 52/241; H04W 88/08; H04W 16/28; H04W 72/04;
(Continued)

(56) References Cited

U.S. PATENT DOCUMENTS 8,724,728 B2 *  5/2014  Choi, II ............... H04B 7/0619
                                                        375/267
2018/0048442 A1  2/2018  Sang
(Continued)

OTHER PUBLICATIONS

International Search Report and Written Opinion from corresponding International Application No. PCT/IB2019/051598, dated Jun. 17, 2019, 13 pages.
(Continued)

*Primary Examiner* — Eva Y Puente
(74) *Attorney, Agent, or Firm* — Tucker Ellis LLP

(57) ABSTRACT

A method includes communicating, between a first device and a second device, a scheduling control message indicative of first time-frequency resources for a first uplink reference signal transmission from the second device to the first device and further indicative of second time-frequency resources for a second uplink reference signal transmission from the second device to the first device. Wherein the first uplink reference signal transmission is associated with a receive beam having a first opening angle. Wherein the second uplink reference signal transmission is associated with a receive beam having a second opening angle. The first opening angle is smaller than the second opening angle. Furthermore the first uplink reference signal transmission is beam swept at the first device, and the second uplink reference signal transmission is not beam swept at the first device.

20 Claims, 8 Drawing Sheets

(51) Int. Cl.
*H04B 7/08* (2006.01)
*H04L 5/00* (2006.01)
*H04W 72/04* (2009.01)

(52) U.S. Cl.
CPC .......... *H04L 5/0023* (2013.01); *H04L 5/0048* (2013.01); *H04L 5/0069* (2013.01); *H04W 72/046* (2013.01); *H04W 72/0413* (2013.01); *H04J 3/0652* (2013.01)

(58) Field of Classification Search
CPC . H04W 16/14; H04W 72/0453; H04W 28/06; H04W 40/04; H04W 52/265; H04W 52/283; H04L 27/2602; H04L 5/0007; H04L 5/005; H04L 27/2646; H04L 5/0044; H04L 27/26; H04L 27/2605; H04L 27/2607; H04L 27/2627; H04L 27/263; H04L 27/2626; H04B 7/0617; H04B 7/0695; H04B 7/0413; H04B 7/0456; H04B 7/10; H04B 7/18504; H04B 7/0626; H04B 7/088; H04B 7/18502; H04B 1/1027; H04B 1/692; H04B 7/0408; H04B 7/0417
USPC .................................................. 375/267, 262
See application file for complete search history.

(56) References Cited

U.S. PATENT DOCUMENTS

2020/0028544 A1* 1/2020 Bengtsson ............. H04B 7/088
2020/0084680 A1* 3/2020 Deenoo .................. H04W 8/22
2020/0305182 A1* 9/2020 Zhou ................ H04W 72/1289

OTHER PUBLICATIONS

Samsung, "Issues on beam management", 3GPP TSG RAN WG1 Meeting AH 1801, R1-1800432, dated Jan. 13, 2018, 12 pages.
Vivo, "Remaining details on beam measurement and reporting", 3GPP TSG RAN WG1 Meeting #91; R1-1719769, dated Nov. 18, 2017, 8 pages.
Asutek, "Beam management in NR", 3GPP TSG-RAN WG2 Meeting #95bis; R2-166588, dated Oct. 9, 2016, 4 pages.

* cited by examiner

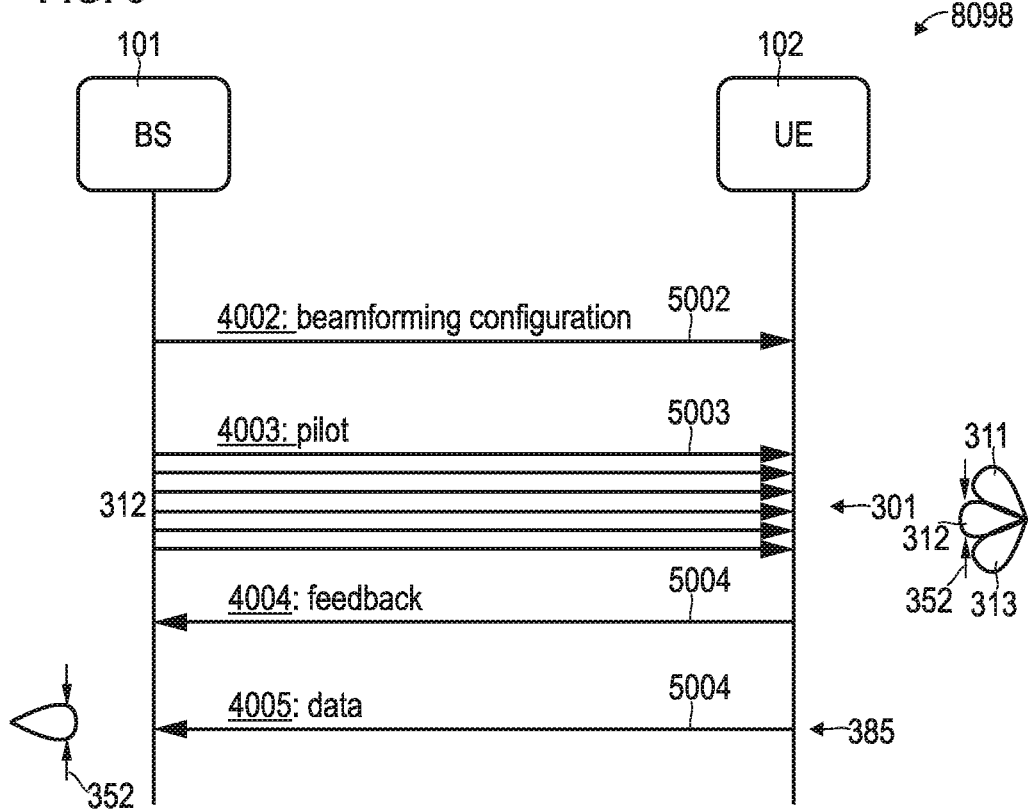
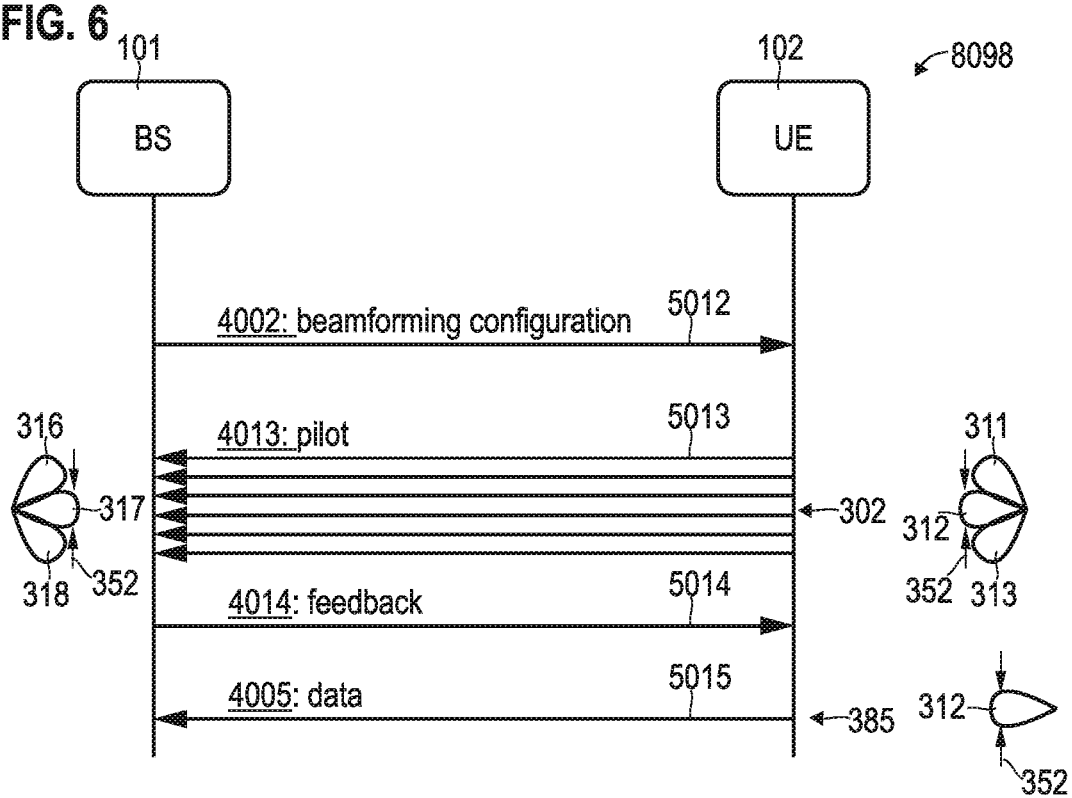

TAILORED BEAM MANAGEMENT OF BEAMFORMED TRANSMISSION

TECHNICAL FIELD

Various examples of the invention generally relate to beamformed transmission. Various examples of the invention specifically relate to beam management of beams used for the beamformed transmission.

BACKGROUND

Wireless beamformed transmission is becoming increasingly popular. One advantage of beamforming is the ability to transmit on high carrier frequencies by increasing antenna aperture, e.g., above 6 GHz and even up to 60 GHz or beyond. Large bandwidths may be achieved. Another advantage of beamforming is the availability of spatial multiplexing, thereby increasing spectral efficiency. The overall antenna efficiency can be increased.

Various applications of beamforming are envisioned in the Third Generation Partnership Project (3GPP) New Radio (NR) or 5G communication system. Within the scope of 3GPP NR, the devices—such as terminals/user equipments (UEs) and base stations (BS)—shall be able to communicate with significantly higher radio frequencies than the existing 3GPP standards such as Wideband Code Division Multiple Access (WDCMA) and Long Term Evolution (LTE). Examples of such higher frequencies are within 20-40 GHz, in addition to the communication bandwidths around 1-2 GHz that are specified for the legacy 3GPP standards. The higher frequencies are sometimes referred to as "mmWave" frequencies, since the wavelength is approaching same order of magnitudes as a millimeter.

When communicating at these high frequencies and thereby small wavelengths, the dimensions of each antenna element become quite small. Thus, there is the opportunity to include many more antenna elements for mmWave communication for a given physical size of an antenna patch—sometimes also referred to as module or panel —, than it would for a e.g. 1 GHz modem. Also, since the radio propagation loss is scaled with frequency, a high antenna gain is required to provide reasonable system coverage when communicating using mmWave frequencies.

All in all, this results in typical implementations of transmitter and/or receiver in which the antenna patches are combining phased-array transmissions/receptions in accordance with certain values determined for antenna weights of multiple antenna elements for the same data stream, efficiently creating a transmission directivity. Here, the gain in a certain direction is often several dBs higher than the gain from a single antenna element (beamforming gain). As a rule of thumb, gain increases of 6 dB per doubling the count of antenna elements has been observed. The phase-coherent superposition of transmitting and/or receiving (communicating) on a plurality of antenna elements of an antenna patch is referred to as beamforming or beamformed transmission.

The amplitude and phase relationship between the different antenna elements are specified by the specific values of antenna weights, where each value of the antenna weights is indicative of the amplitude and phase of a given antenna element of an antenna patch. Different values of the antenna weights are associated with different beams of the beamformed transmission; beams may differ in terms of direction, beam width, etc. By changing the value of the antenna weights or alternate between using different antenna elements to form beams, it is possible to switch between different beams (beam switching). Different gain can be achieved for different directions.

A beamformed transmission may generally be employed for receiving signals (receive beamforming) and/or for transmitting signals (transmit beamforming). Receive beamforming uses a receive beam. Transmit beamforming uses a transmit beam.

A beamformed transmission may be implemented in uplink (UL) and/or in downlink (DL).

The use of multiple antenna elements is sometimes referred to as Multiple Input Multiple Output (MIMO).

When implementing a beamformed transmission, the direction of the one or more beams may have a significant impact on the link performance. This is because of the transmission characteristics varying for different spatial propagation paths that are defined by the beams. For example, a particular low path loss may be expected for transmission along a line-of-sight spatial propagation channel. Generally, a beam oriented in the right direction will improve the link budget with many dBs, according to the beamforming gain.

According to reference implementations, typically a beam-swept transmission including multiple beams is employed to determine the values of the antenna weights, i.e., in order to determine the appropriate beam for UL data transmission and/or DL data transmission. Specifically, the appropriate orientation of the beam to be used has to be determined.

In a beam-swept transmission, one or more reference signals (sometimes also referred to as pilot signals) are transmitted. An UL beam-swept transmission of UL reference signals is possible. Also, a DL beam-swept transmission of DL reference signals is possible.

The beam-swept transmission may include transmit beamforming; here, the one or more reference signals are transmitted on a plurality of beams. Alternatively or additionally, receive beamforming is possible. Here, the one or more reference signals are received on a plurality of beams. Based on a receive property of the reference signal, it is then possible to identify the appropriate beam.

Beam management may include all such techniques which help to select a proper beam, or indicate that beam switching is needed etc. Beam management may include the routine for repeated beam sweeps to avoid a degradation of the link performance, e.g., due to UE mobility.

It has been observed that employing beam sweeps requires significant resources. For mobility reasons, beam sweeps may have to be repeated at a comparably high periodicity; therefore, control overhead is significant. Often, beam management requires continuous, dedicated beam sweep to search for redundant beams.

SUMMARY

Therefore, a need exists for advanced techniques of determining a beam for UL transmission and/or DL transmission, e.g., of application data or control data. Specifically, a need exists for techniques which overcome or mitigate at least some of the above-identified restrictions and drawbacks. This need is met by the features of the independent claims. The features of the dependent claims define embodiments.

A method includes communicating at least one scheduling control message. The at least one scheduling control message is communicated between a first device and a second device. The at least one scheduling control message is indicative of first time-frequency resources for a first UL reference signal transmission. The at least one scheduling control message is further indicative of second time-frequency resources for a second UL reference signal transmission. The first UL reference signal transmission is associated with a receive beam which has a first opening angle. The second UL reference signal transmission is associated with a receive beam having a second opening angle. The first opening angle is smaller than the second opening angle. For example, the first UL reference signal transmission is transmitted from the second device to the first device, and the second UL reference signal transmission is transmitted from the second device to the first device. For example, the first UL reference signal transmission is beam-swept at the first device, and the second UL reference signal transmission is not beam-swept at the first device.

DL direction and UL direction refer to opposite transmission directions. For example, DL direction, as used herein, may refer to a direction from the first device and to the second device; and UL direction, as used herein, may refer to a direction from the second device and to the first device.

The first device may be a BS or a UE. The second device may be a UE or a BS. Also, peer-to-peer communication between two UEs or two BSs would be possible.

The scheduling control message may be an UL scheduling control message or a DL scheduling control message. Typically, the BS may implement scheduling functionality.

A UE is configured to receive a least one DL scheduling control message. The at least one DL scheduling control message is received from a BS. The at least one DL scheduling control message is indicative of first time-frequency resources for a first UL reference signal transmission and is further indicative of second time-frequency resources for a second UL reference signal transmission. The first UL reference signal transmission is associated with a receive beam which has a first opening angle. The second UL reference signal transmission is associated with a receive beam which has a second opening angle. The first opening angle is smaller than the second opening angle.

A UE is configured to receive at least one DL scheduling control message. The at least one DL scheduling control message is received from a BS. The at least one DL scheduling control message is indicative of first time-frequency resources for a first DL reference signal transmission and is further indicative of second time-frequency resources for a second DL reference signal transmission. The first DL reference signal transmission is associated with a receive beam which has a first opening angle. The second DL reference signal transmission is associated with a receive beam which has a second opening angle. The first opening angle is smaller than the second opening angle.

A BS is configured to transmit at least one DL scheduling control message. The at least one DL scheduling control message is transmitted to a UE. The at least one DL scheduling control message is indicative of first time-frequency resources for a first UL reference signal transmission and is further indicative of second time-frequency resources for a second UL reference signal transmission. The first UL reference signal transmission is associated with a receive beam which has a first opening angle. The second UL reference signal transmission is associated with a receive beam which has a second opening angle. The first opening angle is smaller than the second opening angle.

A BS is configured to transmit at least one DL scheduling control message. The at least one DL scheduling control message is transmitted to a UE. The at least one DL scheduling control message is indicative of first time-frequency resources for a first DL reference signal transmission and is further indicative of second time-frequency resources for a second DL reference signal transmission. The first DL reference signal transmission is associated with a receive beam which has a first opening angle. The second DL reference signal transmission is associated with a receive beam which has a second opening angle. The first opening angle is smaller than the second opening angle.

A method includes selectively activating a codebook channel sounding operational mode including a beam-swept first reference signal transmission in first time-frequency resources; and selectively activating a non-codebook channel sounding operational mode including an a second reference signal transmission in second time-frequency resources. The first reference signal transmission is associated with a receive beam having a first opening angle. The second reference signal transmission is associated with a second receive beam having a second opening angle. The first opening angle is smaller than the second opening angle. For example, the receive beam associated with the first reference signal transmission is beam-swept, and the receive beam associated with the second reference signal transmission is not beam-swept.

A device—such as a UE or a BS—is configured to selectively activate a codebook channel sounding operational mode including a beam-swept first reference signal transmission in first time-frequency resources; and to selectively activate a non-codebook channel sounding operational mode including an a second reference signal transmission in second time-frequency resources. The first reference signal transmission is associated with a receive beam having a first opening angle. The second reference signal transmission is associated with a second receive beam having a second opening angle. The first opening angle is smaller than the second opening angle. For example, the receive beam associated with the first reference signal transmission is beam-swept, and the receive beam associated with the second reference signal transmission is not beam-swept.

A computer program or computer program product includes program code. The program code can be executed by at least one processor. Executing the program code can cause the at least one processor to perform a method. The method includes communicating at least one scheduling control message. The at least one scheduling control message is communicated between a first device and a second device. The at least one scheduling control message is indicative of first time-frequency resources for a first UL reference signal transmission and further indicative of second time-frequency resources for a second UL reference signal transmission. The first UL reference signal transmission is associated with a receive beam which has a first opening angle. The second UL reference signal transmission is associated with a receive beam having a second opening angle. The first opening angle is smaller than the second opening angle. For example, the receive beam associated with the first UL reference signal transmission is beam-swept, and the receive beam associated with the second UL reference signal transmission is not beam-swept.

A computer program or computer program product includes program code. The program code can be executed by at least one processor. Executing the program code can cause the at least one processor to perform a method. The method includes selectively activating a codebook channel sounding operational mode including a beam-swept first reference signal transmission in first time-frequency resources; and selectively activating a non-codebook channel sounding operational mode including a second reference signal transmission in second time-frequency resources. The first reference signal transmission is associated with a receive beam having a first opening angle. The second reference signal transmission is associated with a second receive beam having a second opening angle. The first opening angle is smaller than the second opening angle. For example, the receive beam associated with the first reference signal transmission is beam-swept, and the receive beam associated with the second reference signal transmission is not beam-swept.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 5 schematically illustrates a beam-swept DL reference signal transmission associated with a codebook operational mode according to various examples.

FIG. 6 schematically illustrates a beam-swept UL reference signal transmission associated with a codebook operational mode according to various examples.

DETAILED DESCRIPTION OF EMBODIMENTS

Figure 1:
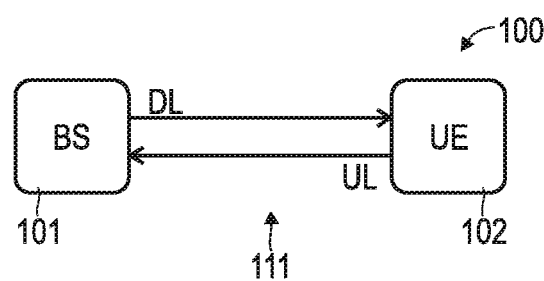
FIG. 1 schematically illustrates a wireless network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

Hereinafter, techniques of communicating between a UE and a BS are described. As a general, rule, similar techniques may also be applied for communicating between other kinds of devices, e.g., in a peer-to-peer communication such as on a sidelink channel, etc.

For sake of simplicity, the direction of communicating from the BS to the UE is labeled DL direction; and the direction of communicating from the UE is labeled UL direction. As a general rule, various example techniques described herein for DL transmission may be equally applied to UL transmission; and vice versa.

The techniques described herein may facilitate determining beams used for transmission of data—e.g., payload data such as application data or control data such as Layer 2 or Layer 3 control data. As such, the techniques described herein may generally facilitate efficient beamforming and/or spatial diversity. Facilitating beamforming may, in turn, facilitate spatial multiplexing and high frequencies, e.g., above 6 GHz or 10 GHz or even above 50 GHz. The bandwidth can be in the range of 100 MHz and 1 GHz.

By using certain values of antenna weights, a well-defined spatial profile of the wireless transmission via the plurality of antenna elements may be obtained, typically referred to as a beam. The beam may thus define a directivity of transmitting and/or receiving. The spatial profile may define a certain opening angle and amplitude of the beam. The spatial profile may define side lobes which may be suppressed if compared to a central peak of the beam. The spatial profile may be associated with a propagation channel of the respective signals; here, the propagation channel may include one or more reflections, etc.

The techniques described herein facilitate determining beams for a data transmission. Specifically, according to various examples described herein, the respective values of the antenna weights can be efficiently and accurately determined. For example, control overhead required for determining beams can be reduced if compared to reference scenarios. The latency of determining beams can be reduced. At the same time, the appropriate beam may be identified at high accuracy.

According to examples, multiple operational modes for beam management of a wireless link between an UE and the BS are available for activation. Here, the different operational modes may be associated with different strategies of determining beams. As such, the different operational modes may be referred to as channel sounding operational modes (for sake of simplicity, referred to as operational mode, hereinafter).

This is because the channel between UE and BS is sounded to identify the appropriate beam. By having the flexibility to activate different operational modes, situation-aware beam management.

Specifically, it may be possible to tailor the activated operational mode depending on the various decision criteria. The activation of the appropriate operational mode can be based on one or more of the following parameters: a beamforming capability of the BS such as a digital beamforming capability of a receiver of the BS; an interference level between the UE and one or more further UEs; an energy balance of the UE; a beam-swept reference signal transmission between the UE and the BS, e.g., a beam-swept UL reference signal transmission and/or a beam-swept DL reference signal transmission; a receive signal strength of at least one reference signal of such a beam-swept reference signal transmission; reciprocity and/or richness of a channel between the UE and the BS; channel strength of communication on the wireless link; received power level at the BS; received power level at the UE; transmit power level at the BS; transmit power level at the UE; bit error rate (BER); need for robustness, e.g., in view of mobility; need for low latency; number of available beams, e.g., associated with an indication of a channel richness; power setting demanded by the BS; interference situation, given that the selected beam may change the interference situation in a signal as the signal is distributed, e.g., with lower power compared to another beam.

As a general rule, selection of the operational mode to be activated may involve logic at the BS and/or may involve logic at the UE. For example, the decision making process may be situated at the UE or, at least in parts, at the BS.

A first operational mode of the beam management may be labeled codebook (CB) operational mode. The CB operational mode may determine a beam by selecting a given beam from a plurality of predefined candidate beams. As such, the CB operational mode may determine associated values for the antenna weights from a plurality of predefined candidate values of the antenna weights. For example, these candidate values may be included in a CB. Each entry in the CB may be associated with a beam. The CB may be network-controlled; for example, if multiple candidate values are available, then the BS may activate the appropriate value and signal its choice to the UE. Hence, in the CB operational mode, the result space of possible values of the antenna weights to be determined is limited and discrete. In other words, there is an a-priori limited count of candidate beams from which the appropriate beam is selected. Such a scenario is typically encountered where the values of the antenna weights are determined in accordance with one or more beam-swept transmissions of reference signals. Then, based on a beam-swept reference signal transmission between the BS and the UE, e.g., a receive beam for an UL data transmission and/or a transmit beam for a DL data transmission may be selected from a plurality of candidate receive beams. For example, a DL transmit beam sweep may be employed at the BS and a DL receive beam sweep may be employed at the UE. Alternatively or additionally, it would also be possible to perform an UL transmit beam sweep at the UE and perform an UL receive beam sweep at the BS. Here, a beam sweep may include transmission and/or reception of reference signals on multiple beams of the beam-swept transmission. For example, all or at least some candidate values of antenna weights included in the CB may be covered by the beam-swept transmission.

By comparing the receive properties—e.g., amplitude and/or phase and/or signal strength, etc.—of the reference signals communicated on the various beams of the beam-swept transmission, it becomes possible to conclude back on which beam is appropriate. Then, the values of the antenna weights can be determined in accordance with that beam. In a scenario where reciprocity is assumed, it may be sufficient to rely on either a beam-swept DL reference signal transmission or a beam-swept UL reference signal transmission. Feedback control signaling can be employed between the BS and the UE, to inform the counterpart of the selected beam. Details of associated beam management including beam-swept transmission are, e.g., described in 3GPP TSG RAN WG1 meeting #86, R1-166089; R1-167466; R1-167543; R1-166389.

A second operational mode of the beam management may be referred to as non-CB operational mode. The non-CB operational mode may—different from the CB operational mode—not rely on predefined candidate values, but rather use a calculation using a receive property of a reference signal—e.g., an UL reference signal and/or a DL reference signal, such as a sounding reference signal (SRS), a demodulation reference signal (DM-RS), or a Channel State Information Reference Signal—communicated between the UE and the BS as an input. Hence, the result space of potential values of antenna weights may not be discrete, but rather continuous. The result space may not be limited a priori by candidate values. There may be no a-priori defined candidate beams. The calculation may include a matrix inversion of a channel matrix. Specifically, the transmitted reference signal may be known to the receiver and based on a comparison of the actual receive property with the corresponding transmit property, the channel matrix may be derived. The channel matrix may be indicative of any modification to the signal along the propagation path, e.g., fading, phase shifts, and/or path loss, etc. The receive property may include amplitude and/or phase. Then, based on the channel matrix—e.g., an inversion thereof to provide pre-coding to compensate for any influences of the channel on the signal—the appropriate values for the antenna weights may be determined. Typically, the non-CB operational mode may rely on UL reference signals transmitted by the UE and received by the BS. Then, the BS can use the receive property of the UL reference signals to determine the values for the antenna weights to be used by the BS. For example, based on a receive property of at least one UL reference signal it may be possible to calculate the antenna weights of a receive beam associated with an UL data transmission and/or calculate antenna weights of a transmit beam associated with a DL data transmission. Likewise, based on a receive property of at least one DL reference signal, it may be possible to calculate the antenna weights of a receive beam associated with a DL data transmission and/or calculate antenna weights of a transmit beam associated with an UL data transmission.

Various techniques are based on the finding that—according to reference implementations—the non-CB operational mode is limited by the available transmit power available for wide opening angles of the associated transmit beam used by the UE for transmitting UL reference signals. For example, in reference implementations, the UL reference signals may be transmitted from a single antenna (here, zero values for the antenna weights of the other antennas may be selected); or pre-coded to be pseudo-omnidirectional. This may correspond to providing for a comparably wide opening angle of the transmit beam, e.g., larger than 120°, optionally larger than 260°, further optionally larger than 340°. Thus, according to reference implementations, the non-CB operational mode may not be suited for a significant interference level and/or significant path loss, due to the limited directivity. Further, the non-CB operational mode can result in increased interference in a cell. This is because of the wide opening angle conventionally employed for the respective transmit beam of the UL reference signal transmission. Further, reference techniques face restrictions in terms of power efficiency of the non-CB operational mode, because of the large transmit power required for the wide opening angle.

Further, various techniques are based on the finding that richly scattered scenarios often rely on non-line of sight (LOS) propagation along spatial propagation channels. Such a scenario is often referred to as a "rich channel scenario". The richness may correlate with the degree of non-LOS propagation. In such a rich channel scenario, it can be advantageous to use a non-CB operational mode, because a gain obtainable from beamforming increases. Hence, the channel can have a higher rank and the capacity increases.

On the other hand, various techniques are based on the finding that the CB operational mode is not significantly limited by such transmit power constraints and interference constraints. Also, the CB operational mode provides for a larger beamforming gain if compared to the non-CB operational mode; here the beamforming gain may be defined as the maximum achievable gain due to beamforming.

Beamforming gain can be achieved by (I) analog beamforming; or (II) digital beamforming. Typically, analog beamforming is limited to a single received/transmitted signal per time unit. Therefore, the optimal antenna weights cannot be determined based on the reception of a single pilot signal. Typically, for analog beamforming a CB operational mode is required.

Differently, digital beamforming supports receiving/transmitting multiple signals contemporaneously. This is typically enabled—for receiving—by recording signals from all antennas and postprocessing them, e.g., in digital domain. The achieved beamforming gain for analog beamforming is sometimes referred to as processing gain.

Typically, the CB operational mode has a disadvantage of a lower processing gain if compared to the non-CB operational mode.

According to various techniques described herein it becomes possible to overcome such limitations of the non-CB operational mode at least to some degree. This facilitates situation-aware and dynamic activation and deactivation of different operational modes such as the CB operational mode and the non-CB operational mode. Tailored beam management becomes possible, because the non-CB and CB operational modes may be activated as needed.

According to various techniques described herein, such effects are achieved by providing dedicated time-frequency resources for an UL reference signal transmission, wherein the UL reference signal transmission is associated with a receive beam implemented at the BS that has a particularly wide opening angle.

Specifically, it would be possible to transmit and/or receive (communicate), from the BS and to a UE, at least one DL scheduling control message. The DL scheduling control message can be indicative of first time-frequency resources for transmission first UL reference signal transmission. The DL scheduling control message can also be indicative of second time-frequency resources for a second UL reference signal transmission. Here, the first UL reference signal transmission can be associated with a receive beam—implemented at the BS—having a first opening angle. The second UL reference signal transmission can be associated with a receive beam—implemented at the BS—having a second opening angle. The first opening angle can be smaller than the second opening angle, e.g., at least by a factor of 2, optionally at least by a factor of 4, further optionally at least by a factor of 12.

Similar techniques may also be applied for UL reference signal transmission from the UE to the BS, e.g., also scheduled by the BS using a DL scheduling control message.

For this reason, hereinafter, the first time-frequency resources are labeled narrow-angle time-frequency resources and the second time-frequency resources are labeled wide-angle time-frequency resources. Likewise, the receive beam associated with the first reference signal transmission is labeled narrow-angle receive beam; while the receive beam associated with the second UL reference signal transmission is labeled wide-angle receive beam. The first UL reference signal transmission is labeled narrow-angle UL reference signal transmission. The second UL reference signal transmission is labeled wide-angle UL reference signal transmission.

For example, at least one UL reference signal may be communicated from the UE and to the BS on the wide-angle time-frequency resources. Alternatively or additionally, at least one UL reference signal may be communicated from the UE and to the BS on the narrow-angle time-frequency resources. Generally, the same or different reference signals may be communicated in different resources.

Such techniques facilitate a non-CB operational mode implemented based on a receive property of the at least one wide-angle UL reference signal communicated on the wide-angle time-frequency resources. Thus, the wide-angle UL reference signal transmission may be associated with the non-CB operational mode.

Likewise, the narrow-angle UL reference signal transmission may be associated with the CB operational mode. As such, the narrow-angle UL reference signal transmission may be beam-swept, e.g., using a receive beam sweep at the BS and/or a transmit beam sweep at the UE.

By using the wide-angle receive beam for the UL reference signal transmission, a narrow-angle transmit beam may be facilitated for the UL reference signal transmission at the UE. This mitigates transmit-power constraints. Further, energy consumption can be reduced at the UE. By using the wide-angle time-frequency resources, the BS is not required to permanently operate using the wide-angle receive beam. This reduces power consumption and interference. The BS may not be required to implement a receive beam sweep for the wide-angle UL reference signal transmission; this reduces power consumption.

For example, an opening angle of the wide-angle receive beam associated with the wide-angle UL reference signal transmission may not be smaller than 80°, optionally not be smaller than 120°, optionally not smaller than 300°. This may be facilitated by digital beamforming.

As a general rule, various strategies are available for determining the transmit beam associated with the wide-angle UL reference signal transmission. For example, at least one DL reference signal may be communicated from the BS and to the UE. The UE may use such DL reference signal—e.g., a synchronization signal and/or another broadcasted signal—to determine the direction or directions at which the BS can be reached. Specifically, it would be possible to determine the transmit beam associated with the wide-angle UL reference signal transmission based on a receive property of the at least one DL reference signal. Then, based on the receive property, it is possible to determine the orientation of the transmit beam associated with the wide-angle UL reference signal transmission. For example, it would be possible that the DL reference signal is communicated in accordance with a beam-swept DL reference signal transmission. For example, multiple DL reference signals can be broadcasted by the BS in two or more different directions—associated with the different beams of the corresponding transmit beam sweep—and the UE can select the appropriate transmit beam for the wide-angle UL reference signal transmission from a corresponding set of candidate beams associated with the beam sweep. Hence, in other words, by—at least occasionally—listening for DL reference signals that may be broadcasted by the BS, an estimation of one or more directions at which an UL reference signal transmitted using a transmit beam would reach the BS can be done. The UE can then transmit the UL reference signal in the dominant direction or directions, based on this assessment. This facilitates the non-CB operational mode for beam management.

The opening angle of such a transmit beam of the wide-angle UL reference signal transmission may define a subset of the full UE coverage, e.g. at subset including the strongest few directions estimated by the UE.

Nonetheless, it may be desirable to use a transmit beam for the wide-angle UL reference signal transmission that has a comparable large width. For example, the width of the transmit beam associated with the wide-angle UL reference signal transmission may be larger than the width of the transmit beam associated with the narrow-angle UL reference signal transmission. For example, the narrow-angle UL reference signal transmission may be beam-swept at the UE; thereby, each individual beam of the beam sweep may have a comparable small opening angle.

For example, a width of the transmit beam associated with the wide-angle UL reference signal transmission may not be smaller than 40°, optionally not be smaller than 120°.

Because the wide-angle UL reference signal transmission can then originate from different directions—depending on the UE position —, the BS employs the wide-angle receive beam for the wide-angle UL reference signal transmission. Also, rich scattering scenarios can thereby be accounted for.

Sometimes, the BS may not even be capable of operating using the wide-angle receive beam. Then, this limitation may be indicated in a respective DL capability control message. For example, it has been observed that digital beamforming of a receiver of the BS—if compared to analog beamforming—can support such wide-angle receive beams.

Digital beamforming may typically employ a time-duplex configuration which is capable of transmitting and/or receiving more than a single beam at each moment in time. Therefore, different beams of the beam sweep can be transmitted and/or received contemporaneously. This facilitates wide opening angles that may be formed by a superposition of multiple sub-beams activated contemporaneously. For example, multiple transmitter chains may be provided, each equipped with the respective digital-to-analog converter. Multiple receiver chains may be provided, each equipped with a respective analogue-to-digital converter. This may be in contrast to analog beamforming where, typically, multiple receiver chains share a common converter.

According to various examples, such wide-angle reference signal transmission—and, along with that, the non-CB operational mode—may be flexibly activated and deactivated. For example, the UE may activate the wide-angle UL reference signal transmission in response to receiving a DL capability control message from the BS which is indicative of the BS being capable of operating using the wide-angle receive beam. Likewise, it would be possible that the BS may activate a wide-angle DL reference signal transmission in response to receiving an UL capability control message from the UE which is indicative of the UE being capable of operating using the wide-angle receive beam. As mentioned above, other decision criteria may be taken into account, e.g., locally at the UE or BS. Then, the respective device can decide to either activate or deactivate the wide-angle reference signal transmission, depending on the appropriate decision criterion. The respective device may then access or not access the wide-angle time-frequency resources, depending on the activation or deactivation.

As a general rule, different operational modes can be used for UL transmission and DL transmission. For example, above, various techniques have been described in which—based on wide-angle time-frequency resources—a non-CB operational mode is facilitated using an wide-angle UL reference signal transmission. Then, a receive beam for a subsequent UL data transmission can be set accordingly. At the same time, it would be possible to use a CB operational mode for DL transmission. Here, the BS may use a beam-swept DL reference signal transmission. The UE can use feedback control signaling to report the strongest DL beam, estimated from the respective one or more DL reference signals. In other scenarios, also for the DL transmission a CB operational mode may be employed. For example, the UE can transmit one or more UL reference signals in multiple directions—while UL data can be transmitted in a single beam. The BS can use the UL reference signals to pre-code the DL data.

FIG. 1 schematically illustrates a wireless communication network 100 that may benefit from the techniques disclosed herein. The network may be a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a BS 101 and a UE 102. A wireless link 111 is established between the BS 101—e.g., a gNB in the 3GPP NR framework—and the UE 102. The wireless link 111 includes a DL wireless link from the BS 101 to the UE 102; and further includes an UL wireless link from the UE 102 to the BS 101. Time-division duplexing (TDD), frequency-division duplexing (FDD), and/or code-division duplexing (CDD) may be employed for mitigating interference between UL and DL. Likewise, TDD, FDD, CDD and/or spatial division duplexing (SDD) may be employed for mitigating interference between multiple UEs communicating on the wireless link 111 (not shown in FIG. 1).

The wireless link 111 may occupy frequencies above 6 GHz. mmWave technology may be employed.

The UE 102 may be one of the following: a smartphone; a cellular phone; a tablet; a notebook; a computer; a smart TV; an MTC device; an eMTC device; an IoT device; an NB-loT device; a sensor; an actuator; etc.

Figure 2:
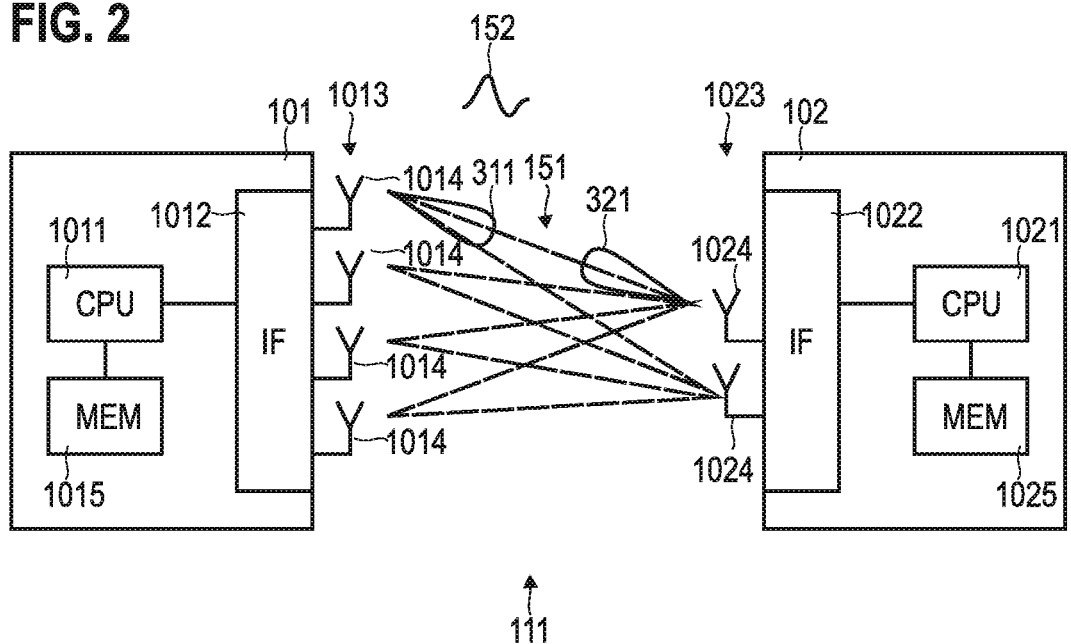
FIG. 2 schematically illustrates the network of FIG. 1 in greater detail.

FIG. 2 schematically illustrates the BS 101 and the UE 102 in greater detail. The BS 101 includes a processor 1011 and an interface 1012, sometimes also referred to as frontend. The interface 1012 is coupled via antenna ports (not shown in FIG. 2) with an antenna patch 1013 including a plurality of antennas 1014. In some examples, the antenna patch 1013 may include at least 30 antennas 1014, optionally at least 110 antennas, further optionally at least 200 antennas. Antenna panels are sometimes also referred to as antenna patch. Sometimes, a scenario implementing a large number of antennas 1014 is referred to as full dimension multi-input multi-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern. In some examples the BS 101 may include multiple antenna patches.

The BS 101 further includes a memory 1015, e.g., a non-volatile memory. The memory may store program code that can be executed by the processor 1011. Executing the program code may cause the processor 1011 to perform techniques with respect to communicating one or more UL and/or DL reference signals, beam sweeps, and scheduling wide-angle time-frequency resources and narrow-angle time-frequency resources as disclosed herein. Thus, the processor 1011 and the memory 1015 form a control circuit.

The UE 102 includes a processor 1021 and an interface 1022, sometimes also referred to as frontend. The interface 1022 is coupled via antenna ports (not shown in FIG. 2) with an antenna patch 1023 including a plurality of antennas 1024. In some examples, the antenna patch 1023 may include at least 6 antennas, optionally at least 16 antennas, further optionally at least 32 antennas. Generally, the antenna patch 1023 of the UE 102 may include fewer antennas 1024 than the antenna patch 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern. Also the UE 102 may include multiple antenna patches 1023.

The UE 102 further includes a memory 1025, e.g., a non-volatile memory. The memory 1025 may store program code that can be executed by the processor 1021. Executing the program code may cause the processor 1021 to perform techniques with respect to communicating one or more UL and/or DL reference signals, beam sweeps, and beam management as described herein. Thus, the processor 1021 and the memory 1025 form a control circuit.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different beams 311, 321 (in FIG. 2, for sake of simplicity, only a single beam 321 implemented by the UE 102 and a single beam 311 implemented by the BS 101 are illustrated). For example, to implement a certain propagation channel 151 for DL communication, a certain DL transmit beam may be selected for the antenna patch 1013 of the BS 101.

Here, the beam may generally be implemented by certain values of the antenna weights of the antennas 1014, 1024/antenna ports of the respective antenna patch 1013, 1023. Sometimes, the antenna weights are also referred to as steering vectors or precoding parameters. Accordingly, different beams 311, 321 may be addressed by using different amplitude and phase configurations for the various antennas 1014, 1024/antenna ports of the respective antenna patches 1013, 1023, i.e., different values for the antenna weights.

While in FIG. 2 LOS propagation channels 151 are illustrated, in other examples, non-LOS propagation channels 151 are possible. The amount of non-LOS propagation channels 151 defines a richness of the channels.

In FIG. 2 a scenario including reciprocity of the propagation channel 151 is illustrated. In some scenarios, the path from the BS 101 to the UE 102 may be different from the path from the UE 102 to the BS 102.

Different ones of the propagation channels 151 may have different transmission characteristics such as number of reflections, path loss, and generally transmission reliability and/or capacity. In particular, different propagation channels 151 can have different fading profiles at the position of the respective receiver. Fading typically occurs due to destructive interference of reflected electromagnetic waves carrying the signals at the position of the receiver. Thus, the link performance will vary significantly depending on the selected beam 311, 321/propagation channel 151. This is referred to as beamforming gain. By using appropriate propagation channels 151—by determining the appropriate values for the antenna weights—, diversity can be provided to reduce fading.

According to various examples described herein, determining of the appropriate values for the antenna weights—and, hence, achieving a high beamforming gain—is facilitated through flexible activation of the corresponding operational mode of the beam management. The appropriate beam for transmission and/or reception is thereby determined and transmission on an appropriate propagation path 151 can be implemented. The transmission reliability can be increased. Latency can be reduced. Power consumption can be reduced.

Generally, such multi-beam operation is expected to be used in NR networks operated at carrier frequencies above 6 GHz. Here, the beams from both BS 101 and UE 102 should be aligned to avoid signal loss. To sound the wireless link 111 and the various propagation channels 152, one or more reference signals 152 can be transmitted and received.

Such reference signals 152 as described herein may generally have a well-defined symbol sequence and/or transmission power such that based on a receive property of the reference signals it is possible to sound the wireless link. Sometimes, the reference signals 152 may also be referred to as pilot signals or synchronization signals. In certain scenarios, the reference signals may be indicative of the beam 311, 321 on which they are transmitted. For example, in a CB operational mode, the base sequence used for a given reference signal may be selected in accordance with the respective beam.

Figure 3:
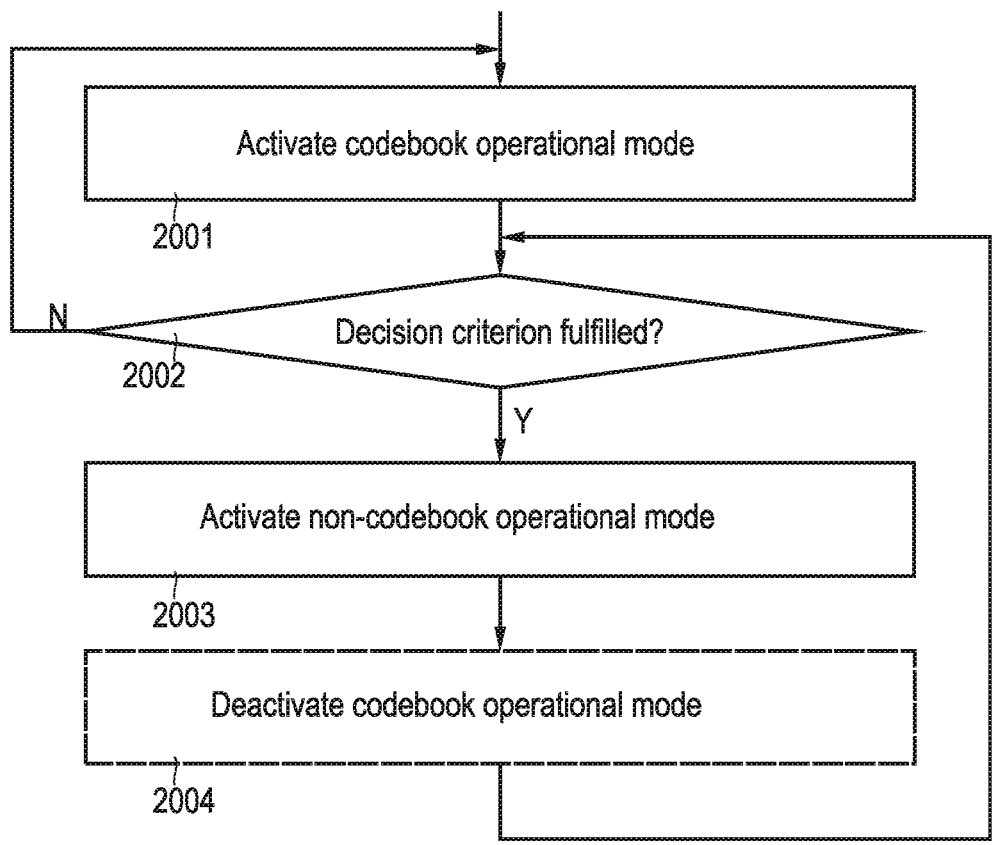
FIG. 3 is a flowchart of a method according to various examples.

FIG. 3 is a flowchart of a method according to various examples. For example, the method of FIG. 3 may be executed by the control circuitry 1011, 1015 of the BS 101; and/or by the control circuitry 1021, 1025 of the UE 102.

At block 2001, a CB operational mode is activated. This may be for channel sounding facilitating UL transmission and/or DL transmission. This may be part of beam management.

The CB operational mode can include a beam-swept narrow-angle reference signal transmission, e.g., in UL or DL. For an beam-swept narrow-angle UL reference signal transmission, the UE may employ a transmit beam sweep including multiple beams. Different beams may be associated with different UL reference signals. The beam-swept narrow-angle UL reference signal transmission may use narrow-angle time-frequency resources. Also, the BS may employ a receive beam sweep. Hence, the narrow-angle UL reference signal transmission may be beam-swept at the BS.

The BS may report the strongest beam by identifying the respective UL reference signal having the strongest receive signal level. The BS may select a transmit beam for a DL data transmission from predefined candidate transmit beams used throughout the beam-swept UL reference signal transmission, under the assumption of reciprocity of the propagation channels.

At block 2002, it is checked whether a certain decision criterion is fulfilled. As a general rule, various decision criteria can be considered, either alone or in combination.

For example, a DL capability control message may be indicative of a beamforming capability of the BS. Then, the decision criterion can take into account the beamforming capability. The beamforming capability can be associated with digital beamforming of the receiver of the interface of the BS. Specifically, it would be possible that the beamforming capability is indicative of a capability of the receiver of the BS to implement a wide-angle receive beam. In some examples, a positive result of the decision testing at block 2002 requires support of wide-angle receive beams by the receiver of the interface of the BS.

In some examples, an UL capability control message may be indicative of a beamforming capability of the UE. This may be considered as a decision criterion for a wide-angle DL reference signal transmission.

In a further example, the decision criterion can take into account an interference level between the respective UE and one or more further UEs. For example, a positive result of the decision testing at block 2002 may require a low interference level, i.e., below a certain predefined threshold.

In a further example, the decision criterion can take into account an energy balance of the UE. For example, a state of charge and/or state of health of a battery of the UE may be taken into account. For example, a positive result of the decision testing at block 2002 may require an energy balance indicating a large state of charge and/or a good state of health of the battery.

In a further example, it would be possible to consider the beam-swept narrow angle UL reference signal transmission of block 2001 as a decision criterion at block 2002. For example, a receive signal strength of one or more UL reference signals of the beam-swept narrow angle UL reference signal transmission may be taken into account as the decision criterion at block 2002. For example, a positive result of the decision testing at block 2002 may require the receive signal strength of at least one reference signal of the beam-swept narrow angle UL reference signal transmission to be above a threshold for a predefined count of beams of the beam-swept narrow angle UL reference signal transmission. For example, the receive signal strength should be above a certain threshold for at least one or two etc. beams.

In a still further example, the decision criterion can take into account a channel richness and/or a channel reciprocity. For example, a positive result of the decision testing at block 2002 may require a large channel richness and/or a large channel reciprocity.

If a positive result of the decision testing is obtained at block 2002, the method commences at block 2003. Here, a non-CB operational mode is activated. Activating the non-CB operational mode includes activating a wide-angle UL reference signal transmission between the UE and the BS. Alternatively or additionally, a wide-angle DL reference signal transmission may be activated.

Activating the wide-angle UL reference signal transmission may correspond to transmitting one or more UL reference signals from the UE to the BS, using a wide-angle receive beam at the BS. The BS may not employ a receive beam sweep. The BS may be configured to listen for the one or more UL reference signals, i.e., for attempting to receive the one or more UL reference signals.

For the wide-angle UL reference signal transmission, wide-angle time-frequency resources are used. Specifically, wide-angle time-frequency resources are such resources during which the BS uses a receive beam which has a comparably wide opening angle; specifically, the opening angle of the receive beam associated with the wide-angle UL reference signal transmission can be larger than an opening angle of the receive beam used for the beam-swept narrow angle UL reference signal transmission of block 2001, i.e., for the narrow-angle time-frequency resources. It is possible to communicate one or more corresponding scheduling control messages that are indicative of the narrow-angle time-frequency resources and the wide-angle time-frequency resources.

In some examples, the non-CB operational mode may be activated in parallel to the CB operational mode. In other examples, the non-CB operational mode may be activated and—upon said activating of the non-CB operational mode—the CB operational mode may be deactivated.

Where both, the non-CB operational mode and the CB operational mode are activated contemporaneously, the antenna weights can be obtained at a high accuracy. This is explained hereinafter.

First, a scenario including reciprocity is assumed. This may be the case, e.g., for TDD. An UL reference signal of the beam-swept narrow-angle UL reference signal transmission is used for sounding the channel intended for an UL data transmission. The BS can determine a receive beam for the UL data transmission. This corresponds to a CB operational mode. At the same time, an UL reference signal of the wide-angle UL reference signal transmission is used by the BS to calculate antenna weights of a transmit beam for a DL data transmission. This corresponds to a non-CB operational mode. Thereby, if UE transmits the UL reference signal on the wide-angle time-frequency resources, the UE can expect that the DL data transmission will employ the same or at least corresponding transmit beam as used for the wide-angle UL reference signal transmission. Thereby, a higher DL capacity in rich environments can be provided. A comparably large amount of wide-angle time-frequency resources may be required.

Second, a scenario not including reciprocity is assumed. This may be the case, e.g., for FDD and, sometimes, also for TDD. An UL reference signal of the wide-angle UL reference signal transmission is used for sounding the channel intended for an UL data transmission; the BS may calculate the respective antenna weights and use them as a receive beam for the UL data transmission. This corresponds to the non-CB operational mode. At the same time, an UL reference signal of the beam-swept narrow angle UL reference signal transmission is used for sounding the channel intended for a DL data transmission. The BS may use a respective transmit beam for the DL data transmission. This is useful when there is no reciprocity, e.g., if UL and DL time-frequency resources are widely separated in time or frequency.

As will be appreciated, generally using the non-CB operational mode, antenna weights of at least one of a transmit beam of a DL data transmission and a receive beam of an UL data transmission may be calculated based on a receive property of an UL reference signal of the wide-angle UL reference signal transmission. This decision may depend on the reciprocity and/or the richness, as explained above.

In other examples, at optional block 2004, the CB operational mode may be deactivated; to thereby reduce control signaling overhead on the wireless link. Again, the reciprocity and/or the richness of the channels between the UE 102 and the BS 101 may be taken into account in the decision on whether to deactivate the CB operational mode and thereby release the narrow-angle time-frequency resources for other use.

For example, it would be possible to selectively deactivate the beam-swept narrow-angle UL reference signal transmission associated with the CB operational mode, based on a receive property of the one or more UL reference signals. For example, if the receive property indicates a strong receive signal strength—e.g., above a certain threshold—then it may be judged that it is sufficient to perform channel sounding using the non-CB operational mode; and, the CB operational mode may be deactivated at block 2004. This helps to reduce control signaling overhead.

Figure 4:
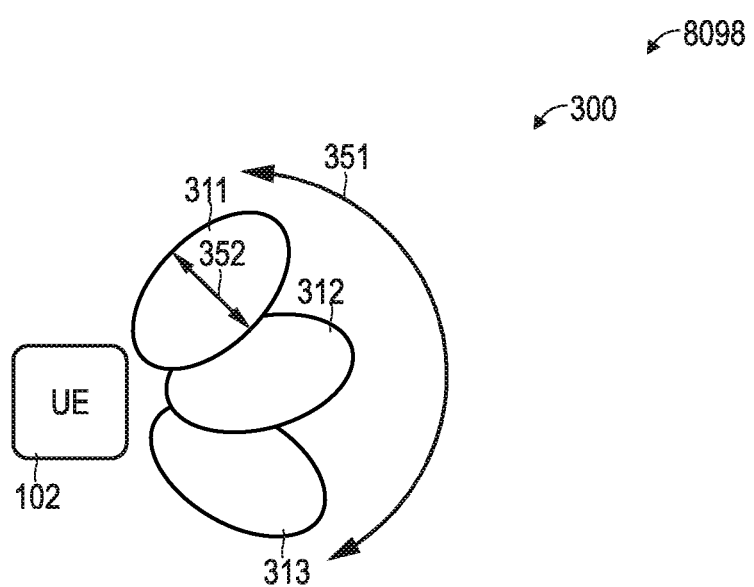
FIG. 4 schematically illustrates a beam-swept transmission according to various examples.

FIG. 4 illustrates a beam-swept transmission 300 of the UE 102. This may be a UL reference signal transmission 300. For example, the transmission 300 may include a transmit beam sweep and/or a receive beam sweep. A transmit beam sweep of the UE 102 may be time-aligned with the receive beam sweep of the BS 101. In another example, a receive beam sweep of the UE 102 may be time-aligned with a transmit beam sweep of the BS 101. Thus, while the BS 101 is transmitting, the UE 102 may be configured to listen, and vice versa.

The beam-swept transmission 300, in the example of FIG. 4, includes three beams 311, 312, 313. Thereby, a certain beam sweep angle 351 is implemented. The beam sweep angle 351 is achieved by the opening angle 352 of each one of the beams 311-313. Depending on the particular beam sweep, the count of beams, the opening angle 352, the beam sweep angle 351, etc., can vary. Typically, the opening angle 352 of the beams 311-313 is comparably small, e.g., less than 50°, or less than 25°. Hence, it can be said that FIG. 4 illustrates a beam-swept narrow-angle UL reference signal transmission 300.

The values of the antenna weights used for each one of the beams 311-313 are predefined in a corresponding CB. Then, e.g., if beam 312 shows a larger signal strength at the receiver if compared to beams 311 and 313, the values of the antenna weight used for subsequent communication on the wireless link 111 may be determined in accordance with the values of the antenna weights defining the beam 312.

Such a beam-swept transmission may also be implemented at the BS 101.

A beam-swept transmission may be used for implementing a CB operational mode 8098. Details with respect to the CB operational mode 8098 are explained in connection with FIGS. 5 and 6.

FIG. 5 illustrates aspects with respect to the CB operational mode 8098. FIG. 5 illustrates aspects with respect to a beam-swept DL reference signal transmission 301. FIG. 5 is a signaling diagram of communication between the BS 101 and the UE 102 on the wireless link 111.

At 5002, a beamforming configuration control message 4002 is transmitted by the BS 101 and received by the UE 102. 5002 is optional. For example, the beamforming configuration control message 4002 may be indicative of a count of beams used in the beam-swept transmission 301. The beamforming configuration control message 4002 may be indicative of a CB to be used for the beams of the beam-swept transmission 301. For example, indices of a CB may be indicated; then each index may correspond to respective values of the antenna weights.

Next, at 5003, the BS 101 transmits multiple DL reference signals 4003 of the beam-swept DL reference signal transmission 301. Different ones of the DL reference signals 4003 are transmitted on different transmit beams of the beam-swept transmission 301. The beams may be in accordance with the beamforming configuration control message 4002. Each DL reference signal 4003 may be indicative of the particular transmit beam on which it has been transmitted. In FIG. 5, also the UE 102 employs a receive beam sweep using receive beams 311-313, which is generally optionally.

The UE 102 can identify the particular transmit beam and/or receive beam of the beam-swept transmission 301 which shows most favorable transmission characteristics.

A respective feedback control signaling 4004 is implemented at 5004. For example, the feedback control signaling 4004 may be indicative of an index of the CB associated with the appropriate beam of the beam-swept transmission 301. Then, the BS 101 may determine the values for the antenna weights by fetching the corresponding entry from the CB. Respective beamforming can then be applied for subsequent DL transmission and UL reception. For example, at 5004, UL data 4005—e.g., application data or control data—of an UL data transmission 385 is communicated from the UE 102 to the BS 101. The BS 101 receives the UL data 4005 using the selected receive beam. The receive beam has a narrow opening angle 352, i.e., is a pencil beam.

As will be appreciated, in the scenario of FIG. 5, it is not required that the BS 101 supports wide-angle receive beams.

FIG. 6 illustrates aspects with respect to the CB operational mode 8098. FIG. 6 schematically illustrates aspects with respect to a beam-swept UL reference signal transmission 302. FIG. 6 is a signaling diagram of communication between the BS 101 and the UE 102 on the wireless link 111.

5012 corresponds to 5002.

At 5013, UL reference signals 4013 of the beam-swept transmission 302 are transmitted by the UE 102 and received by the BS 101 in a corresponding beam-swept UL reference signal transmission 302. Similar considerations as explained above with respect to the beam-swept DL reference signal transmission 301 of the example of FIG. 5 also apply to the beam-swept UL pilot transmission 302 of the example of FIG. 6.

In FIG. 6, the transmit beams 311-313 of the beam sweep at the UE 102 are illustrated. Again, these beams 311-313 are defined in a CB. The BS 101 identifies the beam 312 as having the most favorable transmission characteristics. For this, the BS 101 employs a receive beam sweep using the beams 316-318.

At block 5014, feedback control signaling 4014 is implemented in DL, indicative of the beam 312. This again facilitates determining the values for the antenna weights by retrieving the corresponding entries from the CB in accordance with the appropriate beam 312 identified in the beam-swept transmission 302. The UE 102 then uses the beam 312 for the UL data transmission at 5015.

As will be appreciated from FIGS. 5 and 6, the CB operational mode 8098 is associated with beam-swept reference signal transmissions 301, 302.

Figure 7:
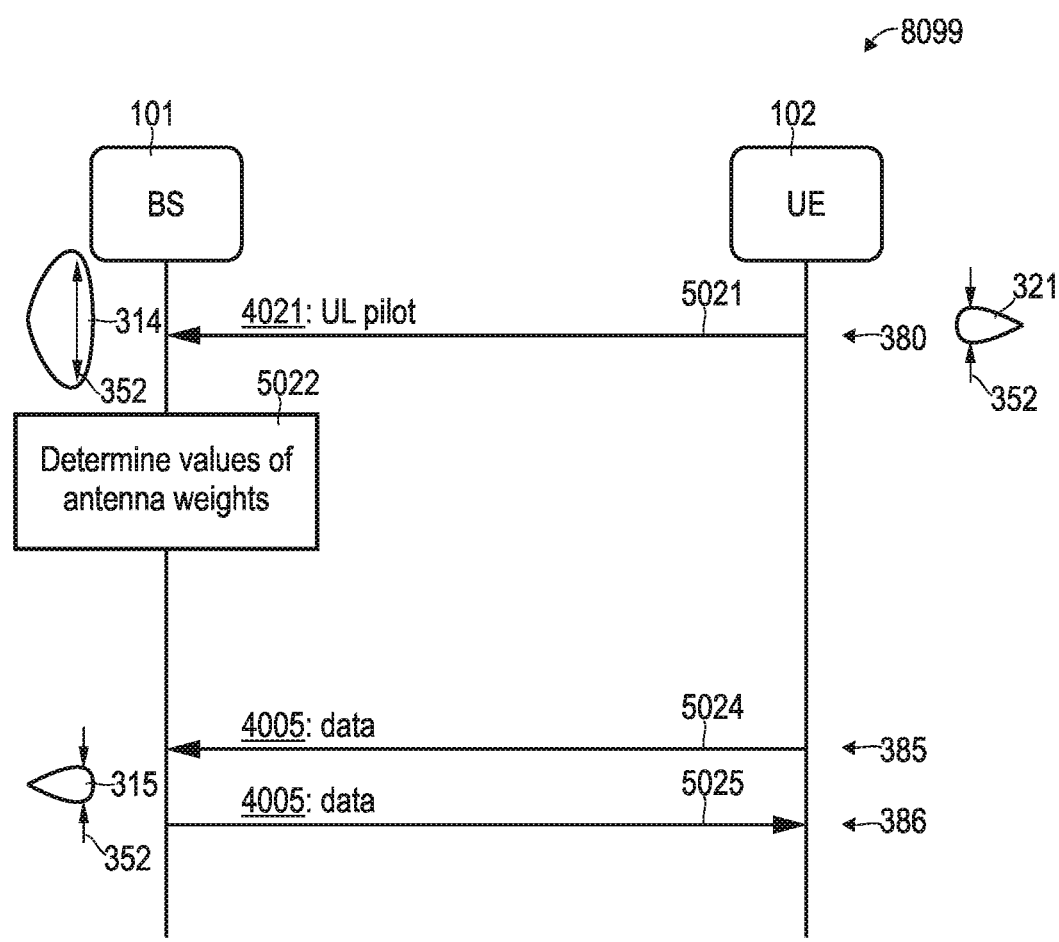
FIG. 7 schematically illustrates an UL reference signal transmission associated with a non-codebook operational mode according to various examples.

FIG. 7 illustrates aspects with respect to the non-CB operational mode 8099. FIG. 7 illustrates aspects with respect to determining antenna weights based on a calculation. FIG. 7 is a signaling diagram of communication between the BS 101 and the UE 102 on the wireless link 111.

At 5021, the UE 102 transmits an UL reference signal 4021, as part of an wide-angle UL reference signal transmission 380. The BS 101 employ a wide opening angle 352 for the receive beam 314, because the position of the UE 102 may vary due to mobility and, hence, it cannot be easily predicted which spatial propagation channel will be occupied by the UL reference signal 4021.

While in FIG. 7 a scenario is illustrated in which the UE 102 employs a comparably narrow transmit beam 321, it would be generally possible that the width 352 of the transmit beam 321 used for the wide-angle UL reference signal transmission 380 is larger than the width 352 of the transmit beams 311-313 of the beam-swept narrow-angle UL reference signal transmission 302 (cf. FIG. 6).

In some examples, the opening angle 352 of the transmit beam 321 may be in the range of 20%-80% of the opening angle 352 of the receive beam 314, for the wide-angle UL reference signal transmission 380.

The BS 101 measures a receive property—e.g., amplitude and/or phase—of the UL reference signal 4021. Then, using the receive property as an input to a corresponding calculation, at 5022, the BS 101 determines the values for antenna weights.

At 5024, UL data 4005 of the UL data transmission 385 is transmitted by the UE 102 and received by the BS 101, using a receive beam 315 as calculated at 5022.

At 5025, DL data 4005 of a DL data transmission 386 is transmitted by the BS 101 and received by the UE 102, the BS 101 using a transmit beam 315 as calculated at 5022.

As will be appreciated from a comparison of FIG. 6 with FIG. 7, in response to activating the wide-angle UL reference signal transmission 380 of the non-CB operational mode 8099, the BS 101 is required to use the wide-angle receive beam 314—instead of the narrow angle receive beams 316-317. To limit the time duration during which the BS 101 uses the wide-angle receive beam 314, it is possible to use dedicated wide-angle time-frequency resources. Then, the wide-angle UL reference signal transmission 380 can be implemented on these wide-angle time-frequency resources.

Figure 8:
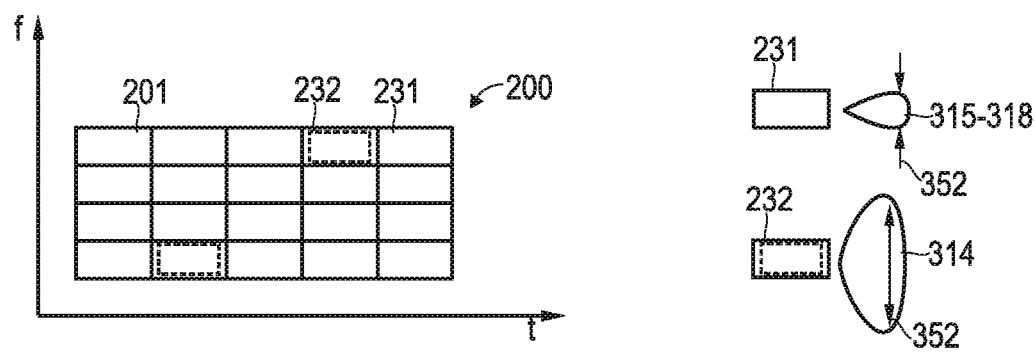
FIG. 8 schematically illustrates allocation of time-frequency resources according to various examples.

FIG. 8 illustrates aspects with respect to time-frequency resources 201. FIG. 8 schematically illustrates a time-frequency resource grid 200 including multiple time-frequency resources 201.

For example, each time-frequency resource 201 may include one or more sub-carriers of an Orthogonal Frequency Division Multiplex (OFDM) modulation scheme. For example, each resource 201 may include one or more symbols of a given subcarrier of the OFDM modulation scheme. As such, these time-frequency resources 201 are also referred to as resource blocks.

Illustrated in FIG. 8 is a scenario in which narrow-angle time-frequency resources 231 are scheduled and in which, furthermore, wide-angle time-frequency resources 232 are scheduled. The resources 231, 232, in the scenario FIG. 8, are orthogonal, i.e., non-overlapping.

As will be appreciated from FIG. 8, the resources 231 and the resources 232 are interleaved in, both, time domain and frequency domain. This provides sufficient opportunity for the wide-angle UL reference signal transmission 380.

The resources 231 are associated with one or more narrow-angle receive beams such as the beam 315 of the UL data transmission 385 (cf. FIG. 7). The resources 232, on the other hand, are for one or more wide-angle receive beams such as the beam 314 of the Wide-angle UL reference signal transmission 318 (cf. FIG. 7).

Figure 9:
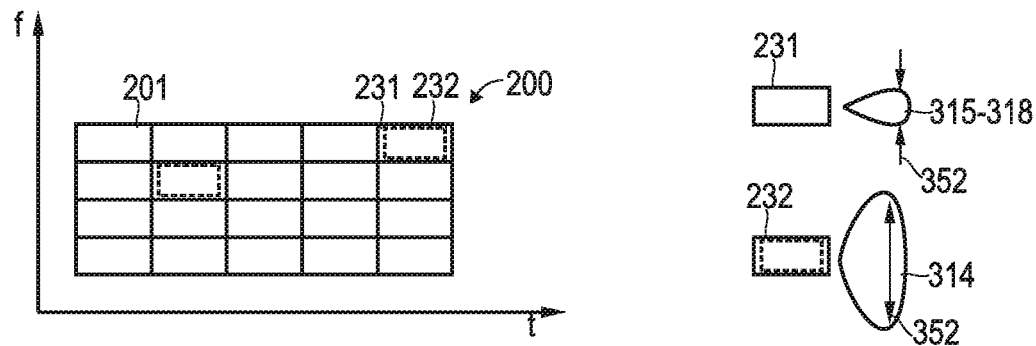
FIG. 9 schematically illustrates allocation of time-frequency resources according to various examples.

FIG. 9 illustrates aspects with respect to time-frequency resources. The scenario FIG. 9 generally corresponds to the scenario FIG. 8. However, in the scenario FIG. 8, the resources 231 and the resources 232 are partly overlapping.

In the overlapping time-frequency resources 231, 232, the BS 101 attempts to receive using, both, the wide-angle receive beam and a narrow-angle receive beam. In some scenarios, the narrow-angle receive beam may be included in the wide-angle received beam; but, in general the narrow-angle receive beam may be offset from the wide-angle receive beam.

Thereby, spectrum utilization is reduced; and, at the same time, the UE is given the opportunity to activate the wide-angle UL reference signal transmission if deemed appropriate in view of the corresponding decision criterion (cf. FIG. 3, block 2002).

Figure 10:
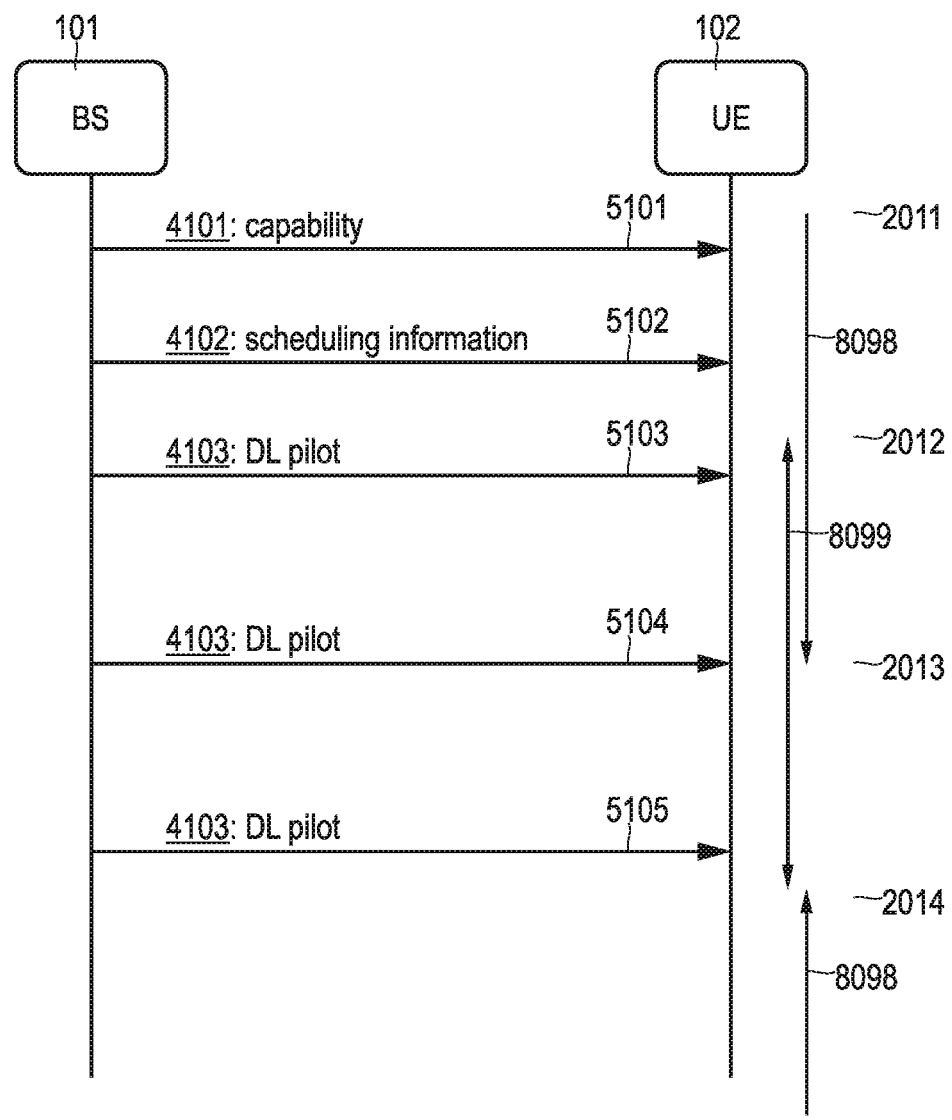
FIG. 10 schematically illustrates scheduling of time-frequency resources according to various examples.

FIG. 10 is a signaling diagram of communication between the BS 101 and the UE 102.

At 5101, a DL capability control message 4101 is transmitted by the BS 101 and received by the UE 102. In the scenario FIG. 10, the DL capability control message 4101 is indicative of the capability of the receiver of the interface 1012 of the BS 101 to implement the wide-angle receive beam 314.

Next, at 5102, a DL scheduling control message 4102 is transmitted by the BS 101 and received by the UE 102. The DL scheduling control message 4102 is indicative of the narrow-angle time-frequency resources 231 and of the wide-angle time-frequency resources 232.

For example, the DL scheduling control message 4102 may semi-persistently or persistently allocate the wide-angle time-frequency resources 232. For example, the wide-angle time-frequency resources 232 may be allocated in a repetitive pattern across multiple subframes of a transmission protocol implemented on the wireless link 111. This gives the UE 102 repeated opportunity to activate the wide-angle UL reference signal transmission 380.

In some examples, multiple scheduling control messages may be used, e.g., different scheduling control message is for the resources 231 and further resources 232 (not illustrated in FIG. 10 for sake of simplicity).

All this occurs after point in time 2011, at which the CB operational mode 8098 has been activated. As such, as part of beam management, beam-swept reference signal transmissions 302 may be repeatedly implemented by the BS 101 and the UE 102 (cf. FIG. is 5 and 6; not illustrated in FIG. 10 for sake of simplicity).

Then, at point in time 2012, the UE 102 decides to activate the non-CB operational mode 8099—e.g., by considering an appropriate decision criterion as explained above; but, for the time being keeps the CB operational mode 8098 activated, as well. As such, as part of beam management, wide-angle UL reference signal transmission 380 using a wide-angle receive beam at the BS 101 may be repeatedly implemented by the BS 101 and the UE 102 (cf. FIG. 7; not illustrated in FIG. 10 for sake of simplicity).

For transmitting the respective one or more UL reference signals 4021, the UE 102 uses a transmit beam 321 (cf. FIG. 7). The transmit beam 321 can be determined based on the receive property of DL reference signals 4103 repeatedly transmitted—e.g., broadcasted—by the BS 101. For example, the DL reference signals 4103 may be transmitted as part of a beam-swept DL reference signal transmission 301 (cf. FIG. 5; not illustrated in FIG. 10, for sake of simplicity). The UE can then determine the transmit beam 321 based on the receive property of one or more DL reference signals 4103. Specifically, an orientation of the transmit beam 321 can be determined.

At point in time 2013, the UE 102 decides—e.g., based on one or more appropriate decision criteria—that the CB operational mode 8098 can be deactivated. For example, if a receive signal strength of the UL reference signals transmitted as part of the CB operational mode 8089 and/or as part of the non-CB operational mode 8099 is larger than a certain threshold, the CB operational mode 8098, and along with that the beam-swept reference signal transmission 302, can be deactivated. The BS 101 may be informed accordingly such that respective time-frequency resources—otherwise allocated for the beam-swept reference signal transmission 301, 302—can be released.

At point in time 2014, the respective decision criterion for deactivating the CB operational mode 8098 and the respective decision criteria for activating the non-CB operational mode 8099 is not fulfilled any more. Hence, the UE 102 deactivates the non-CB operational mode 8099 and activates the CB operational mode 8098, essentially switching back to the initial situation at point in time 2011.

Figure 11:
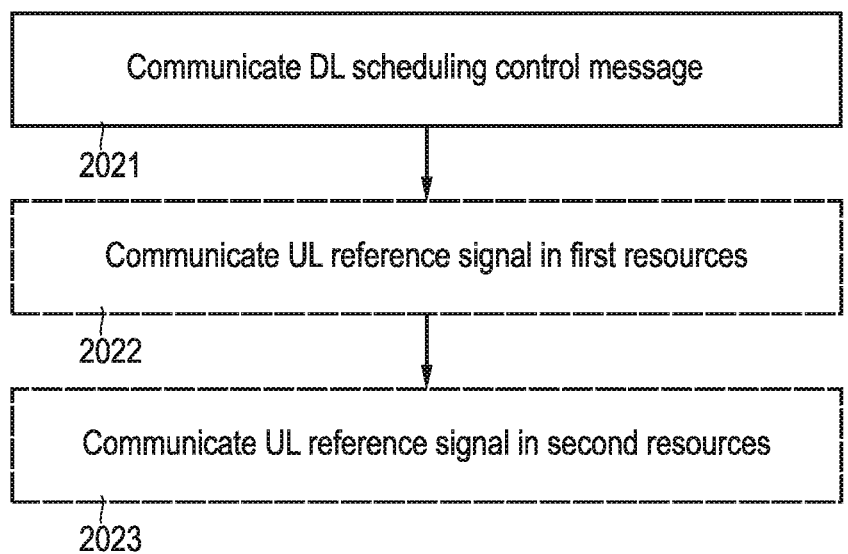
FIG. 11 is a flowchart of a method according to various examples.

FIG. 11 is a flowchart of a method according to various examples. For example, the method of FIG. 11 may be executed by the control circuitry 1011, 1015 of the BS 101; and/or may be executed by the control circuitry 1021, 1025 of the UE 102.

At block 2021, a DL scheduling control message is communicated. For example, at block 2021, the DL scheduling control message may be transmitted by the BS. For example, at block 2021, the DL scheduling control message may be received by the UE (cf. FIG. 10, scheduling control message 4102).

The DL scheduling control message is indicative of first time-frequency resources and is further indicative of second time-frequency resources. The first time-frequency resources and the second time-frequency resources may be non-overlapping/orthogonal, partly overlapping, or even fully overlapping. The first time-frequency resources and the second time-frequency resources may be arranged in an interleaved manner in time domain and/or in frequency domain (cf. FIGS. 8 and 9, narrow-angle time-frequency resources 231 and wide-angle time-frequency resources 232).

The first time-frequency resources are for a first UL reference signal transmission. The second time-frequency resources are for a second UL reference signal transmission.

For example, the first UL reference signal transmission can be associated with a CB operational mode of channel sounding; while the second UL reference signal transmission can be associated with a non-CB operational mode for channel sounding. In the non-CB operational mode, based on a receive property of one or more respective UL reference signals, antenna weights are calculated Next, at optional block 2022, one or more UL reference signals are communicated in the first time-frequency resources. Here, one or more narrow-angle receive beams may be employed at the BS, at least for the part of the first time-frequency resources that is non-overlapping with the second time-frequency resources.

At optional block 2023, one or more UL reference signals are communicated in the second time-frequency resources. Here, a wide-angle receive beam may be employed at the BS. The opening angle of the receive beam associated with the second UL reference signal transmission is larger than the opening angle of the receive beam associated with the first UL reference signal transmission.

Thereby, continuous operation of the BS using a wide-angle receive beam can be avoided; this facilitates reduced interference and reduced power consumption.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various examples have been described in which narrow-angle and wide-angle receive beams are employed at the BS for an UL reference signal transmission. However, respective techniques may be readily implemented for a corresponding scenario in which narrow-angle receive beams and wide-angle receive beams are employed at the UE for a DL reference signal transmission.

For further illustration, above, various scenarios have been described in which communication between a 3GPP-specified BS and a UE is implemented. Similar techniques may be readily applied to other technologies, e.g., IEEE WLAN, etc.

The invention claimed is:

1. A method, comprising:
communicating, between a first device and a second device, a scheduling control message indicative of first time-frequency resources for a first uplink reference signal transmission from the second device to the first device and further indicative of second time-frequency resources for a second uplink reference signal transmission from the second device to the first device,
wherein the first uplink reference signal transmission is associated with a receive beam having a first opening angle,
wherein the second uplink reference signal transmission is associated with a receive beam having a second opening angle, and
wherein the first opening angle is smaller than the second opening angle,
wherein the first uplink reference signal transmission is beam swept at the first device,
wherein the second uplink reference signal transmission is not beam swept at the first device.

2. The method of claim 1, further comprising:
communicating, from the second device and to the first device, at least one uplink reference signal on at least one of the first time-frequency resources and the second time-frequency resources.

3. The method of claim 2, further comprising:
based on a receive property of the at least one uplink reference signal: selectively deactivating the first uplink reference signal transmission.

4. The method of claim 1, further comprising:
based on a receive property of at least one uplink reference signal of the second uplink reference signal transmission: calculating antenna weights of at least one of a transmit beam of a downlink data transmission from the first device to the second device and a receive beam of an uplink data transmission from the second device to the first device.

5. The method of claim 4,
wherein the antenna weights are calculated either for the transmit beam or the receive beam depending on at least one of a reciprocity and a richness of a channel between the first device and the second device.

6. The method of claim 1,
wherein the second uplink reference signal transmission is associated with a transmit beam,
wherein the method further comprising:
communicating, from the first device and to the second device, at least one downlink reference signal, and based on a receive property of the at least one downlink reference signal: determining the transmit beam associated with the second uplink reference signal transmission.

7. The method of claim 6, further comprising:
based on the receive property of at least one downlink reference signal: determining an orientation of the transmit beam associated with the second uplink reference signal transmission.

8. The method of claim 1,
wherein the first time-frequency resources and the second time-frequency resources are at least partly overlapping.

9. The method of claim 1,
wherein the first time-frequency resources and the second time-frequency resources are at least partly interleaved in at least one of time domain and frequency domain.

10. The method of claim 1, further comprising:
communicating, from the first device and to the second device, a downlink capability control message indicative of a beamforming capability of the first device, and
based on the beamforming capability: selectively activating the second uplink reference signal transmission.

11. The method of claim 10,
wherein the beamforming capability is associated with digital beamforming of a receiver of the first device.

12. The method of claim 1, further comprising:
based on an interference level at the second device: selectively activating the second uplink reference signal transmission.

13. The method of claim 1, further comprising:
based on an energy balance of the second device: selectively activating the second uplink reference signal transmission.

14. The method of claim 1,
wherein the first uplink reference signal transmission is beam swept,
wherein the method further comprises:
based on the beam-swept first uplink reference signal transmission: selectively activating the second uplink reference signal transmission.

15. The method of claim 14,
wherein the second uplink reference signal transmission is activated if a receive signal strength of at least one reference signal of the beam-swept first uplink reference signal transmission is above a threshold for a predefined count of beams of the beam-swept first uplink reference signal transmission.

16. The method of claim 1,
based on at least one of a reciprocity and a richness of a channel between the first device and the second device: selectively activating the second uplink reference signal transmission.

17. The method of claim 1,
wherein the scheduling control message allocates the second time-frequency resources semi-persistently or persistently.

18. The method of claim 1,
wherein the first uplink reference signal transmission is associated with a transmit beam having a third opening angle,
wherein the second uplink reference signal transmission is associated with a transmit beam having a fourth opening angle,
wherein the third opening angle is smaller than the fourth opening angle.

19. A base station, comprising:
an interface; and
a plurality of antennas coupled to the interface, the interface transmits, to a user equipment via the plurality of antennas, a scheduling control message indicative of first time-frequency resources for a first uplink reference signal transmission and second time-frequency resources for a second uplink reference signal transmission,
wherein the first uplink reference signal transmission is associated with a receive beam having a first opening angle,
wherein the second uplink reference signal transmission is associated with a receive beam having a second opening angle,
wherein the first opening angle is smaller than the second opening angle,
wherein the first uplink reference signal transmission is beam swept at the base station, and
wherein the second uplink reference signal transmission is not beam swept at the base station.

20. A terminal, comprising:
an interface; and
a plurality of antennas coupled to the interface, the interface receives via the plurality of antennas and from a base station, a scheduling control message indicative of first time-frequency resources for a first uplink reference signal transmission and second time-frequency resources for a second uplink reference signal transmission,
wherein the first uplink reference signal transmission is associated with a receive beam having a first opening angle,
wherein the second uplink reference signal transmission is associated with a receive beam having a second opening angle,
wherein the first opening angle is smaller than the second opening angle,
wherein the interface transmits the first uplink reference signal transmission via the plurality of antennas so that the first uplink reference signal transmission is beam swept at the base station, and
wherein the interface transmits the second uplink reference signal transmission via the plurality of antennas so that the second uplink reference signal transmission is not beam swept at the base station.

* * * * *